Dec. 2, 1930.  W. R. BUNCH  1,783,941
BACK FILLER
Filed Oct. 4, 1926  2 Sheets-Sheet 1

Inventor
Walter R. Bunch
By Lyon+Lyon
Attorneys

Dec. 2, 1930.    W. R. BUNCH    1,783,941
BACK FILLER
Filed Oct. 4, 1926    2 Sheets-Sheet 2

Inventor
Walter R. Bunch
By Lyon & Lyon
Attorneys

Patented Dec. 2, 1930

1,783,941

UNITED STATES PATENT OFFICE

WALTER R. BUNCH, OF LOS ANGELES, CALIFORNIA

BACK FILLER

Application filed October 4, 1926. Serial No. 139,347.

This invention relates to backfillers and is more particularly related to an attachment for tractors, caterpillars and the like for backfilling or bulldozing and is also particularly adaptable for use as a snow plow.

An object of this invention is to provide a backfiller which may be employed for bulldozing or backfilling such, for example, as grading, filling in bridge heads, smoothing dumps, filling trenches, and as a snow plow, and which when employed for filling trenches or as a snow plow may be adapted to and connected with a tractor, tractor of the track-laying type or the like and which may be operated without imposing upon the tractor, or other vehicle, any material side draft.

Another object of this invention is to provide a backfiller attachment of tractors, tractors of the track-laying type or the like, which comprises a blade or scraper member mounted in advance of the power device and which may be swung by the power device to one side or the other thereof and at an angle thereto by simply manipulating the power device and without necessitating the driver thereof leaving his seat.

Another object of this invention is to provide a backfiller attachment for tractors, tractors of the track-laying type or like power devices, which comprises a scraper member or blade constructed and arranged in advance of the power device and which is so connected to the power device that the same may be swung to one side or the other and at an angle to the power device without producing a material side draft on the tractor, enabling the power device to travel straight ahead without any tendency to "tail".

Another object of this invention is to provide an attachment for tractors, tractors of the track-laying type or like power devices, which comprises a scraper or blade member which may be employed either for straight scraping or backfilling and mounted in front of the power device transversely to the line of travel to scrape or grade and which may also be swung by manipulation of the power device to either side and at an angle to the line of travel of the tractor for filling ditches, clearing roads of snow, and the like, and without in any position imposing on the tractor, or like power devices, any material side draft which would prevent the easy and free manipulation of the steering or control of the said power device.

Another object of this invention is to provide a tractor attachment employing a blade, scraper or grading member which is adapted to be mounted in advance of the tractor and which is constructed to prevent the same digging in below a determinate depth during the grading, backfilling or bulldozing or the like, due to the upward pressure of the material moved by the said member.

Another object of this invention is to provide an automatic balancing control means adapted to be employed in action with a backfilling or bulldozing tractor attachment for compensating for and regulating the load or capacity of the scraping, grading or like blade.

Other objects and advantages of this invention will be apparent from the following detailed description of a preferred embodiment thereof as illustrated in the accompanying drawings, in which drawings.

Figure 1:
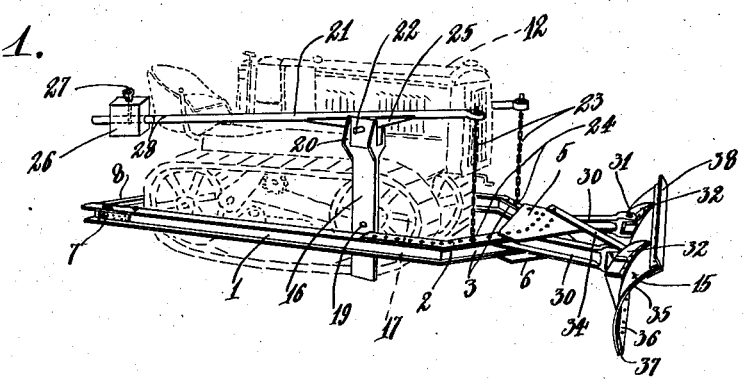
Figure 1 is a perspective view of a backfiller embodying this invention and illustrating the same as mounted to and in position upon a tractor of the track-laying type as illustrated in dotted lines.
Figure 2:
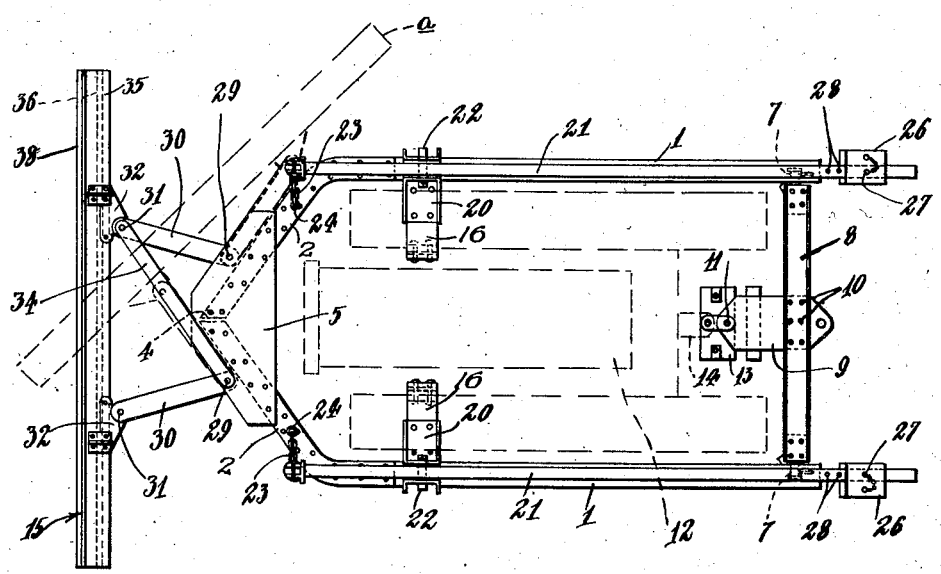
Figure 2 is a top plan view thereof illustrating in full lines the position assumed by the attachment with the blade in the bulldozing position and illustrating in dotted lines the offcenter swung position of the device when employed as a backfiller.
Figure 3:
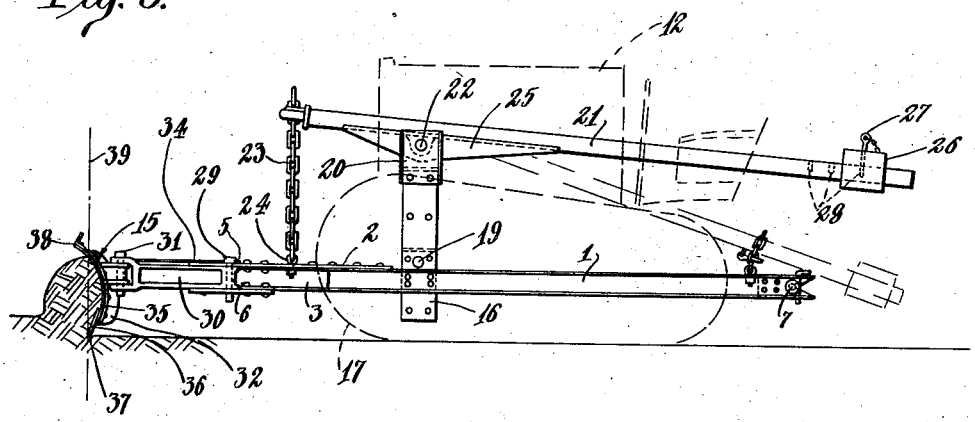
Figure 3 is a side elevation thereof.
Figure 4:
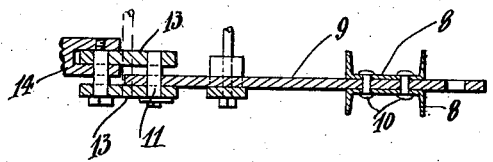
Figure 4 is a fragmental sectional view, illustrating the manner of attachment of the device to a tractor.

In the preferred embodiment of this invention, illustrated in the accompanying drawings, 1 illustrates spaced apart frame members which may be of any desired or preferred construction and are herein illustrated as comprising I-beams.

Secured to the forward end of the frame members 1 by means of plates 2 are converging frame members 3 which meet at a point 4 at the forward end of the frame structure. Overhanging plates 5 and 6 are secured to the frame members 3 for the purposes as will hereinafter appear. The frame structure heretofore described is pivotally supported by trunnions 7 at the rear ends of the frame members 1, which trunnions 7 are secured to a base plate 8, which base plate 8 is preferably constructed of a pair of channel irons between which a supporting bar 9 is mounted and secured by any suitable means such as illustrated at 10. The base plate 8 is secured at its opposite end to the hitch-pin 11 of the tractor 12. The hitch-pin 11 is mounted intermediate the hitch-plates 13, which hitch-plates 13 constitute with the hitch-pin 11 the hitch-tongue of a tractor of the track-laying type of well known construction, the hitch tongue being secured at its opposite end to a hitch-pocket 14, as is customarily provided in such tractor.

I have herein illustrated one form for securing the base plate 8 in position at the rear of the tractor as is particularly adapted for one type of tractor or caterpillar as manufactured. However, any other suitable or desirable means may be provided for securing the base plate 8 in position.

Figure 5:
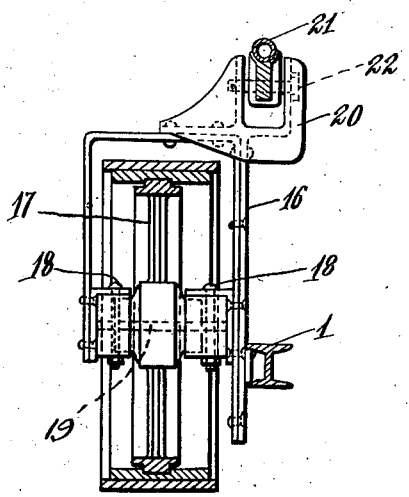
Figure 5 is a fragmental view partly in section, illustrating a yoke construction as employed in mounting the tractor device.

Means are provided for yieldingly supporting the forward end of the frame structure so that the scraper blade 15, carried thereby, when moving a load will automatically adjust itself and respond to variations in surface contours without varying the quantity of the load in any material degree. This flexible suspension of the forward end of the frame also prevents the digging in of the blade into the material during its progress over the surface operated upon. This means preferably comprises yokes 16 which span the drive sprockets 17 of the tractor 12 and which yokes 16 may be of any desired or preferred construction and are secured to the journal bearing housings 18 in which the track sprocket shafts 19 are journaled, as shown in Fig. 5.

Mounted on the yokes 16 are brackets 20 in which brackets 20 balance arms 21 are pivoted at the pins 22. The balance arms 21 are secured at their forward ends by means of a flexible connecting member, such as the chain 23, to the frame members 3 by any suitable means, such as illustrated at 24. The pins 22 pass through saddles 25, in which saddles 25 the arms 21 are secured.

Mounted on the arms 21 are weights 26, which are adjustable therealong for the purpose of counterbalancing the forward end of the frame. The weights 26 are arranged to be secured in position of adjustment by pins 27 which are arranged to be passed through holes 28 provided in the arms 21.

Secured intermediate the plates 5 and 6, preferably at points equally spaced from longitudinal center line of the vehicle at pivots 29 are radius arms 30, which arms 30 are of any suitable or desirable construction and are herein illustrated as comprising castings. The arms 30 are at their opposite ends pivotally secured at pins 31 to brackets 32. The brackets 32 are rigidly secured to and are formed to the curvature of the rear of the blade 15. When employed as a bulldozer, a tie-bar 34 is provided which is mounted intermediate the pin 29 mounted on one side of the frame and the pin 31 on the other side of the frame so as to tie the arms 30 rigidly together and prevent their pivoting on their pivots 29. The blade 15, which is particularly adaptable for use in bulldozing or backfilling and as a snow plow comprises a curved blade 35 to the lower edge of which is secured a plate 36 having a cutting edge 37. The arcuate blade member 35 is so disposed with respect to its supports, which are the arms 30 and 30′, that the upper edge 38 thereof lies in a plane forward of the lower edge 37, as indicated at 39. This disposition of the blade member causes the earth or other material to be moved or pushed thereby in substantially a rolling manner. The pressure upwardly of the material against the upper overhanging portion 38 of the blade member, effectually prevents the blade member from digging into the material beyond the normal capacity of the blade member, and hence, when once loaded, it will remain loaded during the entire period of its forward movement.

The arms 30 are pivoted to the blade 15 so that when the blade 15 is swung, for example, to the dotted line position, illustrated at $a$, the arm 30 on the opposite side from which the blade 15 is swung to, will lie against the inner web of the frame members 3 and the opposite arm 30 will lie against the corresponding web of the opposite longitudinal frame member 3. The pressure imparted by the blade 15 will be equalized on the opposite sides of the power device when swung to this position so as to prevent the imposing upon the power device of a side-draft. The arms 30, it will be noted, are pivoted to the blade 15 at points spaced apart farther than the spacing apart of the pins 29 by means of which the arms 30 are pivotally secured to the frame members 3 so that on continuation of the arms 30 the same would meet at a point to the rear of the blade 15. When employing the blade 15 for a snow plow or for backfilling ditches or the like, the pressure of the load being scraped against the blade 15 when the same is in the position illustrated in dotted lines $a$ will be greater against that portion of the bar lying beyond the pivot point 29 on the side to which the blade 15 is rotated so that the tendency to rotate the power device, due to the off-center working will be equalized by the offset turning force imparted in an opposite direction to the blade 15. The same result will follow when the blade 15 is rotated to the opposite side of the power device in a reverse manner.

The position of the blade 15 is controlled when employing the same for a snow plow or for backfilling by means of the steering controls customarily provided in tractors, caterpillars or the like, the construction and operation of which is well understood to those skilled in the art so that it will not be necessary for applicant to specifically point out and describe the same.

When it is desired to rotate the scraper blade to the position illustrated at $a$ from the position illustrated at full lines, the steering controls are operated to turn the tractor slightly toward the side at which it is desired to operate the blade 15. Assuming the blade in position illustrated at $a$ and it is desired to rotate the blade 15 to the opposite side of the tractor, the steering controls are manipulated to rotate the power device toward the side on which the blade 15 is working, during which manipulation, the scraper blade 15 will rotate on its pivots 29 and 31 to the opposite side of the power device.

Having fully described a preferred embodiment of my invention, it is to be understood that I do not wish to be limited to the exact details herein set forth, which may obviously be varied without departing from the spirit of my invention as set forth in the appended claims.

I claim:

1. In combination with a power device, a frame, means for securing the said frame to the power device, the said frame terminating at a point at the forward end of the power device, a scraper blade, bars pivotally secured on the opposite sides of the said point to the said frame, means for pivotally securing the said bars to the said scraper blade, and a tie-bar connected at its opposite ends with the said scraper blade connecting bars for maintaining the said blade transverse to the angle of travel of the said power device for bulldozing.

2. In combination with a power device, of a frame comprising spaced frame members pivotally secured at their rear to a base-plate, balancing means secured to the said power device and to the said frame at a point near the forward end thereof, a scraper blade, and means secured to the said scraper blade and to the said frame for supporting the said blade forwardly of the said power device to swing freely on either side thereof at an angle.

3. In a backfiller, the combination of a power device, a frame, means for securing the said frame to the said power device, the said frame terminating at a point at the forward end and substantially centrally of the power device, a scraper blade, bars pivotally secured to the said frame on the opposite sides of the said point, and means for pivotally securing the said bars to the scraper blade so that continuations of the said bars would meet at a point behind the said scraper blade.

4. In combination with a power device, of a frame member adapted to be rigidly supported by the power device, spaced frame members pivotally secured to the said stationary frame member and extending in advance of said power device, a scraper blade, means for securing the said scraper blade in advance of the power device to the said spaced frame members to swing freely on either side of the power device and at an angle, and means secured to the power device and to the said frame members for balancing the said frame members and holding the said scraper blade in the engaging position.

5. In combination with a power device, a frame, comprising spaced frame members pivotally secured at their rear ends to the power device, balancing means secured to the said power device and to the said frame at a point near the forward end thereof, a scraping blade, means secured to the said scraper blade and to the said spaced frame members for supporting the said blade forwardly of the power device to swing to either side thereof at an angle, and means for adjusting the said balancing means.

6. In combination with a power device, a frame, comprising spaced frame members, a base-plate securely mounted at the rear of the power device, means for pivotally securing the said frame members to the said base-plate, converging frame members secured to the forward end of the said spaced frame members, a scraper blade, and bars pivotally secured to the said converging frame members and to the said scraper blade in position so that when the said scraper blade is rotated to the backfilling position, the said bars rest against the said converging frame members.

7. In combination with a power device, a frame, spaced frame members, a rear frame member secured to the power device and pivotally connected to the ends of the said spaced frame members, a scraper blade secured to the said forward end of the said spaced frame members, yokes passing over and secured to the traction means of the said power device, balancing bars pivotally supported by the said yokes, means for connecting the balancing bars with the forward ends of the said spaced frame members, and adjustable weight means secured to the said balancing bars.

8. In combination with a vehicle, a pusher frame, means securing said pusher frame to said vehicle, a scraper blade at the forward end of said frame, mounting means to secure said scraper blade to said pusher frame in advance thereof comprising radius arms secured to said frame on pivotal axes disposed transversely on opposite sides of the longitudinal axis of said pusher frame, said radius arms being pivotally secured to said blade on transversely spaced pivotal axes whereby said scraper blade is free to swing to either side of said pusher frame, there being abutment faces on opposite sides of the longitudinal axis of said pusher frame for said radius arms to lie against, whereby both radius arms are enabled to lie against abutment faces with the scraper blade at an angle.

Signed at Los Angeles, California, this 27th day of Sept., 1926.

WALTER R. BUNCH.